US006061047A

United States Patent [19]
Skelton

[11] Patent Number: 6,061,047
[45] Date of Patent: *May 9, 2000

[54] METHOD AND APPARATUS FOR CLIPPING TEXT

[75] Inventor: T. Dean Skelton, San Jose, Calif.

[73] Assignee: Chips & Technologies, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,011

[22] Filed: Sep. 17, 1996

[51] Int. Cl.[7] .......... G06T 15/30

[52] U.S. Cl. .......... 345/118; 345/434; 345/470

[58] Field of Search .......... 345/118, 434, 345/144, 470, 467–469

[56] References Cited

U.S. PATENT DOCUMENTS

| | | | |
|---|---|---|---|
| 3,311,896 | 3/1967 | Delmege, Jr. et al. | 340/172.5 |
| 4,315,310 | 2/1982 | Bayliss et al. | 364/200 |
| 4,323,891 | 4/1982 | Akashi | 340/709 |
| 4,338,597 | 7/1982 | Steiner et al. | 340/706 |
| 4,345,245 | 8/1982 | Vella et al. | 340/744 |
| 4,382,254 | 5/1983 | Ranalli | 340/744 |
| 4,394,641 | 7/1983 | Ratigalas | 340/347 DD |
| 4,527,252 | 7/1985 | Donohue et al. | 364/900 |
| 4,555,191 | 11/1985 | Gojo | 400/121 |
| 4,706,076 | 11/1987 | Racchini | 340/726 |
| 4,716,405 | 12/1987 | Yamaguchi | 340/723 |
| 4,727,480 | 2/1988 | Albright et al. | 364/200 |
| 4,751,502 | 6/1988 | Ishii et al. | 340/709 |
| 4,905,189 | 2/1990 | Brunolli | 364/900 |
| 4,984,183 | 1/1991 | Ohuchi | 345/118 |
| 5,016,000 | 5/1991 | Bugg | 340/731 |
| 5,079,545 | 1/1992 | Priem et al. | 345/118 |
| 5,218,675 | 6/1993 | Arai et al. | 395/166 |
| 5,313,227 | 5/1994 | Aoki et al. | 345/118 |
| 5,384,907 | 1/1995 | Arimatsu | 395/150 |
| 5,414,524 | 5/1995 | Payson et al. | 345/434 |
| 5,455,897 | 10/1995 | Nicholl et al. | 395/134 |
| 5,553,210 | 9/1996 | Narayanaswami | 395/134 |
| 5,613,052 | 3/1997 | Narayanaswami | 395/134 |
| 5,668,941 | 9/1997 | Noorbakhsh | 345/434 |
| 5,699,277 | 12/1997 | Munson et al. | 345/514 |
| 5,771,034 | 6/1998 | Gibson | 345/141 |

*Primary Examiner*—Mark R. Powell
*Assistant Examiner*—Vincent E. Kovalick
*Attorney, Agent, or Firm*—D'Alessandro & Ritchie

[57] ABSTRACT

A method of generating a graphical image, such as a font, is described in which expansion data for an image portion that is not to be written is never added to source data for such portion.

12 Claims, 4 Drawing Sheets

METHOD AND APPARATUS FOR CLIPPING TEXT

BACKGROUND OF THE INVENTION

The present invention relates to the generation of graphical images for graphical operation of a visual display device of, for example, a computer system and, more particularly, to a method and apparatus for clipping that portion of text or other source data not to be written.

It is not unusual in computer operations for it to be desired to prevent generation of a portion of an image while another portion of the same image may be generated. For a typical user, an example is provided by overlay windows on a display screen of a computer system. With most systems, the user can only provide input to the overlay window, i.e., the foremost window open on the screen. This input may extend beyond the borders or boundary of the window. However, only that portion of the text or other image shown in the window is displayed. In other words, text and other image drawing operations sometimes require that portions of the text or other object and its background lying outside of a clipping region not be drawn. (The term "image" is used herein to refer to visual images which are not necessarily images of existing objects.)

Typical approaches require range comparison of the addresses of the data to be written with the clipping region. If the addresses fall outside of the clipping region, then the data is not written. Prior art methods for controlling clipping based on a clipping region, expand the source data for the object and/or its background regardless of whether it is or is not for a portion that ultimately will be written. For example, if a text is to be displayed in color, monochrome source data identifying the fonts of the alphanumeric characters is expanded to define each character in color. Doing so, though, for that portion of the text or other image to be clipped results in wasted timing cycles and consequent delays. These prior art approaches are particularly problematic if the drawing arrangement operates with linear addresses rather than being based on an X/Y coordinate system. When a linear address arrangement is used, additional address variables that define the clipped address range must be calculated for each scan line. It would, of course, be desirable to avoid having to produce such additional address variables.

BRIEF DESCRIPTION OF THE INVENTION

The present invention eliminates the cycles associated with expanding source data defining those portions of a display that will not be written. It does this by determining early in the process which portions(s) of an image is not to be written, and then preventing expansion of the data defining such portion(s). In other words, it segregates the data to be clipped prior to its expansion and prevents expansion of the source data defining the image portion that is to be clipped.

The invention is particularly applicable to drawing logic based on linear addressing. In such an arrangement it has the additional advantage of not requiring one to develop the address variables for data which never will be written.

Other features and advantages of the invention either will become apparent or will be described in connection with the following, more detailed description of a preferred embodiment of the invention and variations.

BRIEF DESCRIPTION OF THE DRAWING

With reference to the accompanying drawing.

DETAILED DESCRIPTION OF THE PREFERRED EMBODIMENT(S)

The following relatively detailed description is provided to satisfy the patent statutes. It will be appreciated by those skilled in the art that various changes and modifications can be made without departing from the invention.

Figure 1:
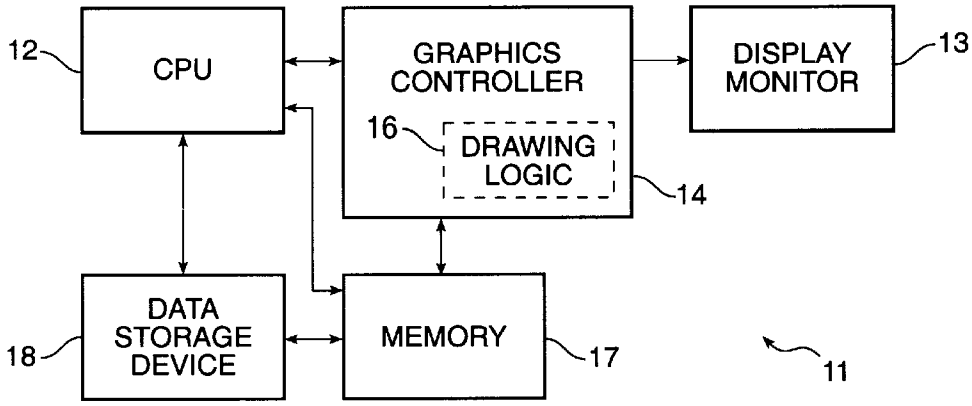
FIG. 1 is an overall block diagram of a computer system incorporating a preferred embodiment of the invention.

An overall computer system, generally referred to by the reference numeral 11, incorporating the invention is illustrated in FIG. 1. It includes a CPU (central processing unit) 12 to which is logically attached, input devices (the keyboard, mice, etc.) and output devices including a display monitor 13. A graphics controller 14 is included as part of the computer system for delivering scan line control signals to monitor 13. Controller 14 takes its instructions from CPU 12. Such controller includes, of course, drawing logic represented by dotted line block 16, which drawing logic will be discussed in more detail hereinafter.

System 11 also includes the memory 17 which is typically required by such a system. While only one box is included to represent the memory, it will be recognized by those skilled in the art that it may be several different memories, e.g., a system memory for the CPU and a dedicated memory for the graphics controller 14. Moreover, the memory may actually be made up of more than one chip or other physical piece of hardware—when reference is made herein to a memory "section" it may or may not be in the same piece of hardware as other memory sections. The system also includes as is illustrated a separate data storage device 18.

The invention is particularly applicable to text clipping (or, in other words, discarding) those portions of alphanumeric characters not to be written. It is designed to provide clipping of alphanumeric characters presented in numerous different fonts. In keeping with the invention, it clips the source data defining the font before it is expanded, i.e., before the data defining the font in monochrome form (referred to often as monochrome source data) is combined with data defining the color of the same. It is to be noted from the broad standpoint that color is just one of the many attributes that otherwise might be more detailed data that may be combined with source data.

Figure 2:
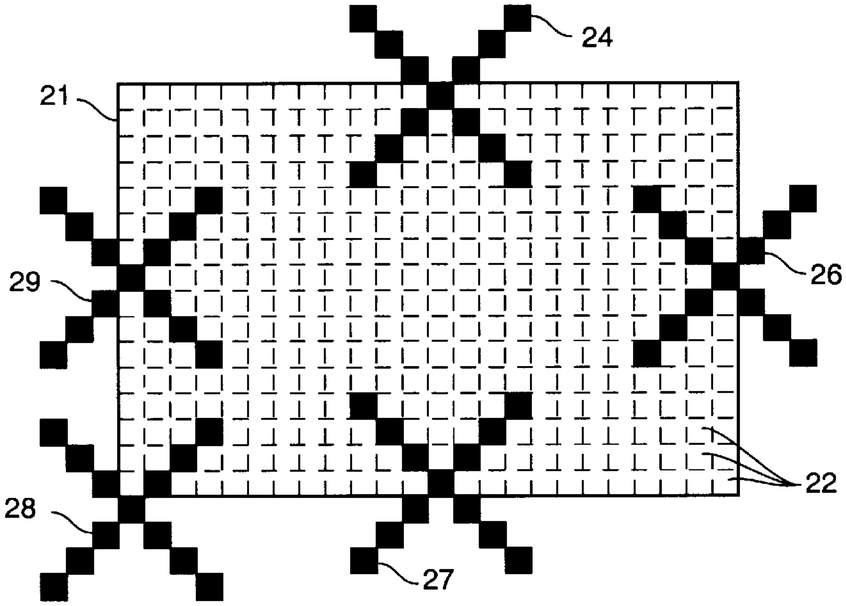
FIG. 2 is a schematic illustration showing a clipping region and images to be clipped.

FIG. 2 is included to simplify an understanding of what is meant by clipping. A rectangular clipping region is generally referred to by the reference numeral 21. As is illustrated, it is made up of a rectangular pattern of pixels 22. Alphanumeric characters to be clipped are represented by the "X"'s 24–29. As is illustrated, each of such "X"'s is partly in and partly outside of the clipping region 21. That is, each crosses over the boundary between the clipping rectangle 21 and the area in which there is to be clipping.

"X" extends at and beyond the uppermost boundary of the clipping region, whereas the "X"'s 26 and 29 respectively extend beyond the right and left side boundaries of such region. The "X" 28 extends both on the left side and beyond the bottom boundary of the clipping region, and "X" 27 extends beyond the bottom. It is the portions of the "X"'s outside the clipping rectangle 21, that are to be "clipped".

It should be noted that the portion of the "X" or other character which extends beyond the bottom boundary simply can be clipped by not writing the information, assuming that the text or other information is being drawn from top to bottom. In this connection, it will be realized that the portion of the "X" 28 which is not only on the left hand side but also below the clipping rectangle simply can be clipped in this fashion. Moreover, the portion of the "X" 24 which extends above the uppermost boundary of the clipping rectangle is initially discarded, i.e., at the beginning of the drawing operation—note that none of the discarded information is on the same scan line as other information to be written.

It will be appreciated that if the source data defining a portion of a font or other image to be clipped is not expanded, the amount of data that defines such portion is relatively low. In this connection, many drawing logic arrangements will only accept data in a particular defined unit size. Moreover, it will be recognized that the width of various alphanumeric characters or other images to be displayed is quite variable. In view of these facts, in most architectures it is necessary that the defined unit of data that is provided be "padded", since it will not be data that defines the resulting image. Padding will be described in some detail for ease in understanding in connection with FIGS. 3A through 3C.

Figure 3A:
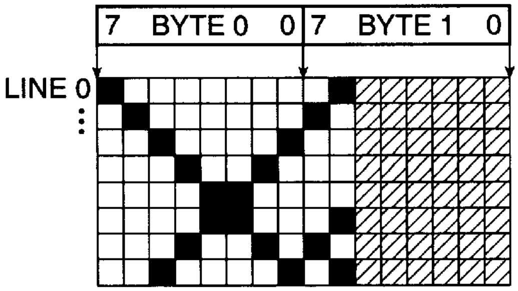
FIGS. 3A, 3B and 3C illustrate differing data packing modes.

FIG. 3A illustrates the source data for an image which is quite similar to one of the "X"'s 24–29. (A black square in the drawing represents a "1" bit whereas a white square represents a "0" bit.) In the example illustrated, the image is 10 bits wide. Source data for the same requires a full byte and 2 bits of the next byte. In the arrangement being described, the remainder of the second byte must be padded. The padded bits are represented by cross hatching.

Figure 3B:
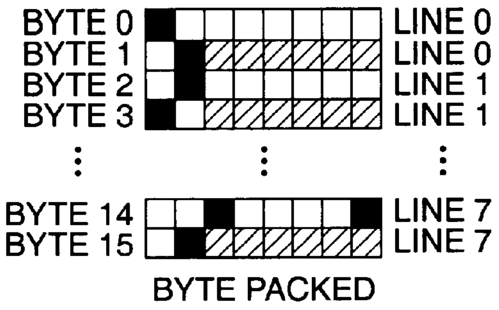
Figure 3C:
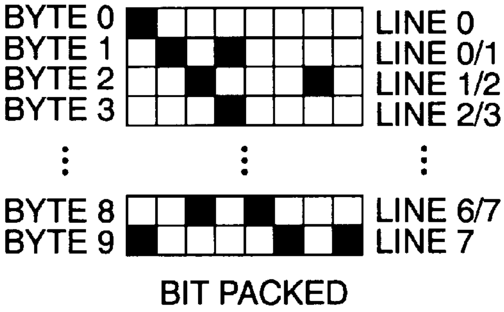

There are two types of padding applicable to this situation, byte or word packing and bit packing. FIG. 3B illustrates a byte packed arrangement corresponding to the illustration in FIG. 3A, whereas FIG. 3C illustrates a bit packed arrangement. Relative to the byte packed (FIG. 3B) arrangement, it will be seen that the data for scan line 0 is stored in the first two bytes with 6 padded bits in the second byte (byte 1). This continues for the length of the image cell, bytes 14 and 15 (line 7) also being illustrated.

The other type of padding is a bit packed arrangement. The first byte (byte 0) will include the bits defining the first 8 bits of the data, whereas the second byte (byte 1) has the two remaining bits of the first line followed immediately by the bits that define the first portion of the next line. Again, this procedure is repeated for the full length of the cell. The last two bytes, bytes 8 and 9, contain the source data for the seventh line, line 6. Byte 8 contains the beginning of the last line, whereas the data for the last part of the line is contained in byte 9 as illustrated. Thus, in a bit packed arrangement in which there are no "don't care" bits, 9 bytes are required to define an image.

It will be recognized that because of the possibilities presented by numerous combinations of packing modes and image cell widths, a flexible system of performing clipping is required when basic data is not to be expanded.

Figure 4:
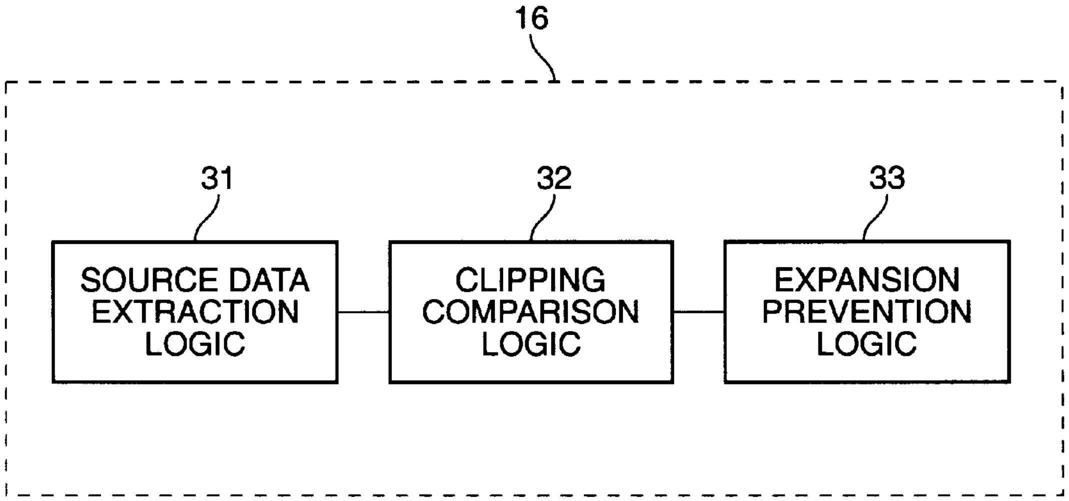
FIG. 4 is another block diagram illustrating a preferred embodiment of the instant invention.

The relevant portions of the drawing logic is generally illustrated in FIG. 4. Such drawing logic includes logic represented by box 31 for extracting the source data defining an image from a section of memory. In this connection, this source data typically is in a section of memory separate and apart from the section or sections having the color or other characteristic attributes to be added to the source data.

The next step is to determine if an image is to be clipped. That is, it is determined if data defining a first portion of the image is, and data defining a second portion of the image is not, to be written. This comparison is represented in FIG. 4 by block 32. In keeping with the invention, then, expansion is prevented of the source data for that portion of the image which is not be included in the image. In other words, the logic prevents combination with such basic data, of the expansion data defining the color or other attributes that the image may have. This logic is represented in FIG. 4 by block 33.

The invention is particularly applicable to a graphical operation which utilizes linear addresses as opposed to one which simply provides the X/Y coordinates of a clipping region. Address variables never have to be generated for memory locations which never will be written. It is also advantageously utilized when the image to be generated is a color one defined by monochrome source data. A large amount of digital data is needed to characterize the color attribute(s) of such an image. This data will not have to be written for the image.

Figure 5A:
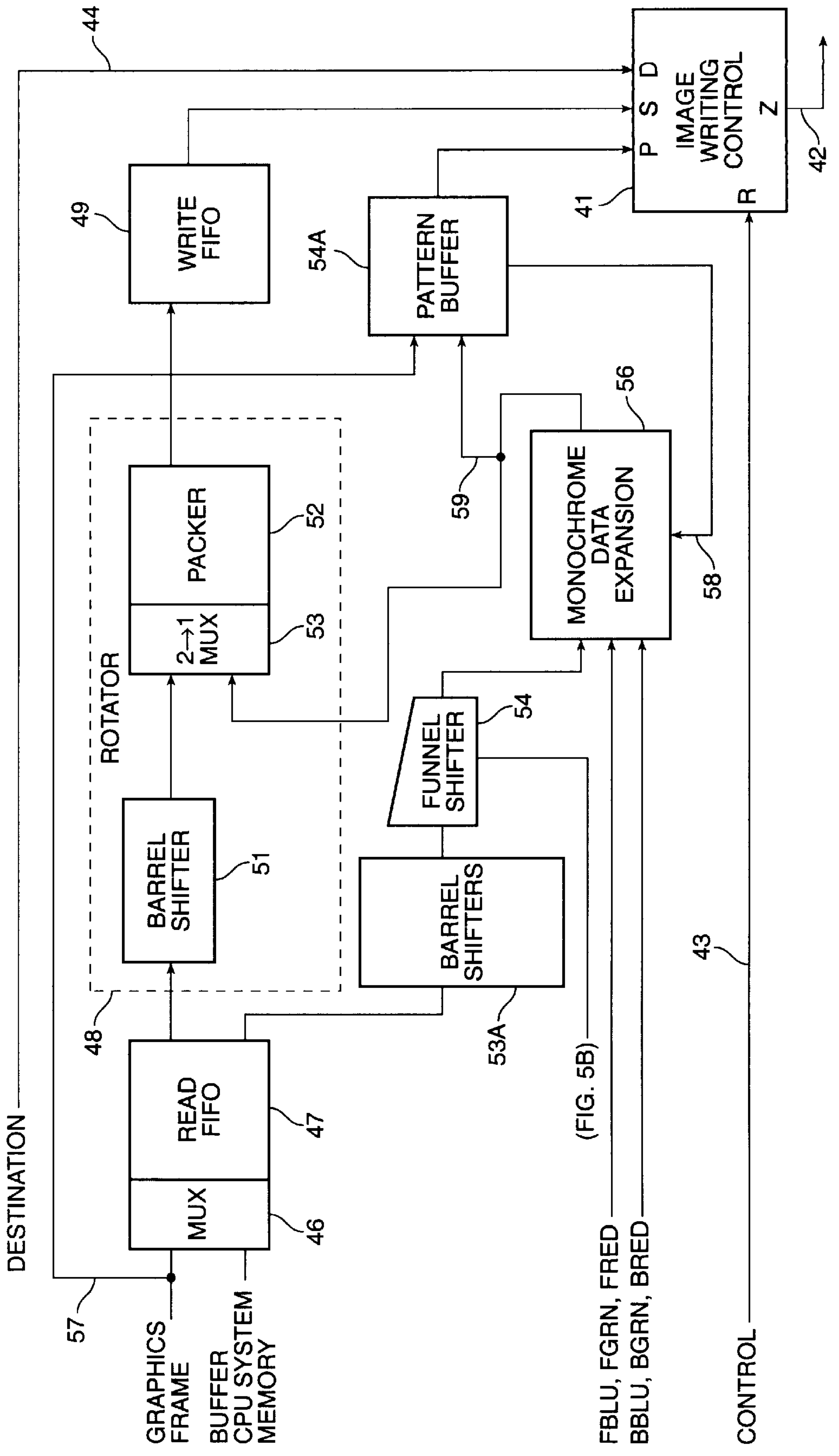
FIG. 5A is a logic flow diagram of an arrangement incorporating a preferred embodiment of the invention.

FIG. 5A is a block diagram of an arrangement incorporated a specific implementation of the invention. In such specific implementation, monochrome source data defining the fonts of alphanumeric characters are clipped.

In this implementation, the memory 17 (FIG. 1) has two sections which are relevant, a system memory section and a separate section usable by the graphics controller. This latter section will be referred to herein as the "graphics frame buffer" section. This operation forms a memory map to be stored in the graphics frame buffer that defines all or part of the image to be applied by the graphics controller, when appropriate, to the display monitor. The combination operation for forming such image map in memory is implemented by "image writing control" logic referred to in FIG. 5A by the reference numeral 41. It is its output 42 which is directed to the graphics frame buffer memory section to be written in an appropriate destination location. Software control of operation of the image writing control logic is represented by input line 43.

The combination operation mentioned above represented by logic 41 is the logical combination of three different operands; a destination operand, a source data operand defining text to be written, and a pattern data operand defining a tile providing background for the specified location having the text. Input to block 41 of destination data is represented by line 44. Such data defines the locations in the graphics buffer memory for the data which provide the image map.

The other two inputs to the image writing control logic are text data (monochrome source data) and pattern data. This data may or may not be expanded before such input. In this implementation, the text data (the monochrome source data) is stored either in the system memory section of the memory 17 or in the graphics frame buffer section. This text data is fed as shown via a 2 to 1 multiplexer (MUX) represented at 46 to a read FIFO 47. Such FIFO is made up of stages flip-flops. If this text data is made up of data to be expanded and data to be clipped, this FIFO cooperates with control logic to provide the clipping, as will be discussed in more detail hereinafter. However, if it is known such text data will be expanded, it is fed to a rotator represented at 48 before it is directed to a write FIFO 49 to be fed into the image writing control logic 41. The write FIFO 49 buffers the data and directs it to the image writing control logic 41 when it is to be combined with pattern data from the pattern buffer 54 and the corresponding destination data.

The rotator 48 is comprised of two functional blocks represented at 51 and 52 for rotating and packing or unpacking the text data. When the text and destination regions are not aligned, then the text data needs to be rotated to align with the destination. "Alignment" refers to how the data is positioned within the word which contains the same. Also, when the source and destination are not aligned, parts of data from two words may need to be packed together to form a destination word, or data from a single word may be split across two destination words.

It is the barrel shifter 51 which does the actual rotation. Its output is directed via a 2 to 1 MUX 53 (the purpose of which will be described hereinafter) to the packer 52. It is the packer 52 which does the splitting and combining mentioned above.

Figure 5B:
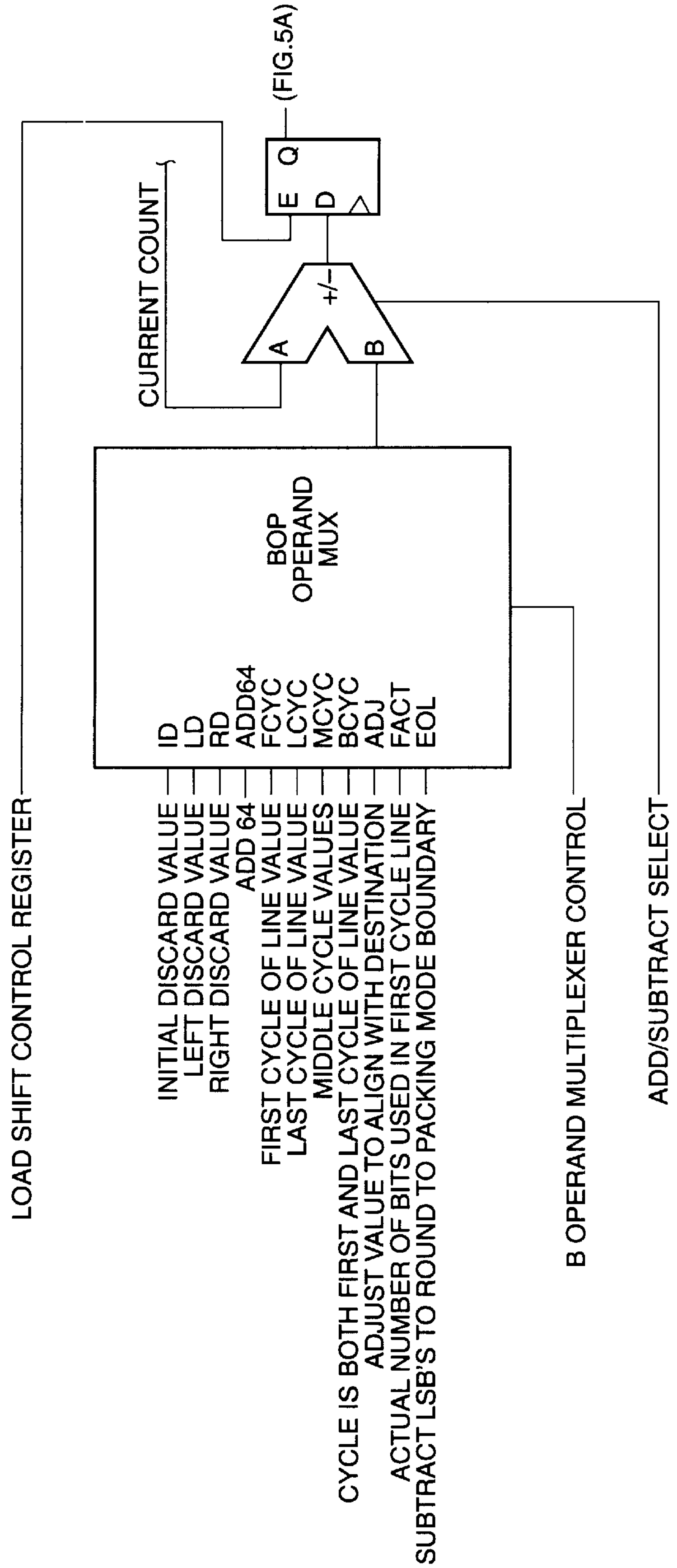
FIG. 5B is control logic for the preferred embodiment of FIG. 5A.

In keeping with the invention, that monochrome source data which is to be clipped is not expanded, whereas that monochrome source data which is to be shown in expanded form is so expanded. It is believed that a detailed description of a specific implementation will facilitate an understanding of such clipping. The clipping is formed by two barrel shifters represented at 53A, and a funnel shifter 54 and its control as is represented by FIG. 5B. As illustrated, the control includes a large multiplexer for selecting one of many inputs for an adder that is used for adding or subtracting an operand from the current count present at its "A" input. The operand (the B operand in the drawing) is selected by the expansion state machine discussed below.

In this implementation, the word length is 64 bits. The combination of the two barrel shifters and the funnel shifter allows the selection of eight adjacent bits from a 64 bit final stage of the read FIFO 47 (FIG. 5A), plus from an eight bit remainder register included in such FIFO. The control signals which select which eight bit window will appear at the output of the funnel shifter come from an expansion counter block in the control logic. Such counter is illustrated in FIG. 5B.

The control includes an expansion state machine (not shown) which is started when the source data is monochrome and needs to be expanded. The state machine starts by waiting for the first data to arrive at the final stage of read FIFO 47. Once data arrives, the font expansion counter is loaded with a value of 64 to indicate the number of valid bits remaining in the final stage of the read FIFO. Next, the value of the initial discard register is subtracted from the current count; the initial discard value is used only once at the start of the operation and is used to adjust the counter to reflect the actual number of valid bits in the first quad word of source data. After each subtraction operation is performed the state machine control tests to see if there are enough valid bits remaining to proceed. If there aren't, then the remaining bits are transferred to the remainder register in the read FIFO 47, a new word is loaded into the final stage of such read FIFO, and 64 is added to the count to reflect the fact that an additional 64 bits of valid data are available.

After the value of the initial discard is subtracted from the count, the expansion state machine subtracts the Left Discard value which essentially "Clips" data from the left side. After subtracting the Left Discard, an "Adjust" value is added to the counter so that the eight bit data window that the counter value selects to expand in the read FIFO 47 using the barrel and funnel shifters will be adjusted so that the expanded data is aligned with the destination. After adjusting for destination alignment, then expansion of a scanline of data proceeds. The value subtracted from the counter for each expansion cycle is dependent on whether the current cycle is the first or last cycle of a line or one of the middle cycles of a line. The differences in the value subtracted are due to the fact that the first and last cycles of a line do not necessarily generate eight valid bytes of data since the first and last valid byte of data may occur in any byte position in the eight byte word. The counter has to keep track of exactly how many bits of monochrome source data are consumed for each expansion cycle and therefore needs to subtract potentially different amounts for the first and last cycles. There is also a special case where the first cycle of a line is also the last, and this case is handled by subtracting a special value that is calculated from the starting and ending addresses.

The consumption rate of the monochrome source data for each cycle is not the same for all cycles. As mentioned previously, the first and last cycles may not necessarily generate eight valid bytes of data due to the fact that the line started or ended in the middle of an eight byte memory word. Also, the consumption rate is different for the different pixel depths. When expanding to eight bits per pixel (BPP), each cycle generates eight bytes of data which corresponds to eight pixels; therefore, each cycle could consume up to eight bits of monochrome source data. When expanding to 16 BPP, each cycle still generates eight bytes of data but due to the fact that each pixel requires two bytes, only four pixels are generated and therefore a maximum of four bits of the monochrome source data are consumed for each cycle. For 24 BPP mode the consumption rate is further complicated by the fact that the number of complete pixels generated per cycle is not constant because each pixel requires three bytes and each cycle generates eight bytes of data. The consumption rate repeats in a three cycle sequence that generates eight complete pixels or 24 bytes of data.

TABLE 1

| | 24 BPP Sequence | | | | | | | |
|---|---|---|---|---|---|---|---|---|
| | Byte 7 | Byte 6 | Byte 5 | Byte 4 | Byte 3 | Byte 2 | Byte 1 | Byte 0 |
| Cycle 0 | P2 GRN | P2 BLU | P1 RED | P1 GRN | P1 BLU | P0 RED | P0 GRN | P0 BLU |
| Cycle 1 | P5 BLU | P4 RED | P4 GRN | P4 BLU | P3 RED | P3 GRN | P3 BLU | P2 RED |
| Cycle 2 | P7 RED | P7 GRN | P7 BLU | P6 RED | P6 GRN | P6 BLU | P5 RED | P5 GRN |

Since the consumption rate and the color component alignment is dependent on the particular cycle of the three cycle sequence the machine is currently processing, a method of initializing and tracking the current cycle number is required. The first cycle of any line can be any one of the three possible cycles in the sequence and the particular cycle can be determined from the starting address of each line if certain constraints are satisfied. If the width of each scanline if 24 BPP mode is an even multiple of 24 bytes, then the cycle number and starting positions within the eight pixel sequence can be decoded from the three least significant bits of the destination address. Once the starting cycle for each scanline is determined, then subsequent cycles are simply the next or previous cycle in the three cycle sequence depending on whether the operation is incrementing or decrementing in the X direction (i.e., left to right or right to left, respectively). Tables 2 and 3 show the decode of the address to cycle and pixel number. There are separate decode tables for the increment and decrement X direction since the starting address specifies the left- or rightmost byte position in the scanline for the operation which is either the RED or BLUE byte of the pixel.

The logic for decoding the address to generate the cycle number in the three cycle sequence can be implemented in a variety of ways. The exact logic for implementing the code can be generated directly from the tables.

TABLE 2

Increment Direction 24 BBP Address Decode

| Address[2:0] | Pixel Number | Cycle Number |
|---|---|---|
| 000 | 0 | 0 |
| 011 | 1 | 0 |
| 110 | 2 | 0 |
| 001 | 3 | 1 |
| 100 | 4 | 1 |
| 111 | 5 | 1 |
| 010 | 6 | 2 |
| 101 | 7 | 2 |

TABLE 3

Decrement Direction 24 BBP Address Decode

| Address[2:0] | Pixel Number | Cycle Number |
|---|---|---|
| 111 | 7 | 2 |
| 100 | 6 | 2 |
| 001 | 5 | 2 |
| 110 | 4 | 1 |
| 011 | 3 | 1 |
| 000 | 2 | 1 |
| 101 | 1 | 0 |
| 010 | 0 | 0 |

At the end of each scanline the Right Discard value is subtracted from the counter which essentially "Clips" data from the right side. After subtracting the Right Discard value the counter is adjusted to account for the selected Packing Mode which basically adjusts the value of the counter to the next byte, word, double word, or quad word boundary or does not adjustment in the case of bit packing.

Source data which is to be expanded is directed to the font expansion block 56. Pattern data also may be expanded. The pattern buffer 54 not only buffers the pattern information before it is fed to the image writing control 41, but it also holds the original pattern data and manipulates the same as needed. The pattern is defined for a particular region and, in this connection, is a particular number of pixels wide and specified number of lines high. It can either be monochrome or color, and line 57 represents feeding of pattern data from the graphics frame buffer section of the memory to the pattern buffer 54A. If pattern data is to be expanded, it is directed by the pattern buffer 54A as is represented by line 58 to the monochrome data expansion block 56. After such expansion it is returned as is represented by line 59 to the pattern buffer.

It is believed that a detailed description of a specific implementation will also facilitate an understanding of data expansion by block 56.

The monochrome data is expanded to one of two colors depending on the state of the data. In this specific implementation, if the monochrome data is "0" then a pixel is generated that has the color specified in a background color register. If the monochrome data is "1" then a pixel is generated that has the color specified in a foreground color register.

The foreground and background color registers specify the colors for a single pixel. This specific implementation operates on up to eight pixels at a time. Therefore, the foreground and background color values need to be replicated up to eight times in order to be able to expand up to eight pixels at a time. For the case of 8 bits per pixel (BPP) the least significant eight bits of the color registers (FBLU, BBLU) are replicated eight times. For 16 BPP the least significant 16 bits of the color register (FBLU, FGRN & BBLU, BGRN) are replicated four times. For 24 BPP mode the entire 24 bit register values are replicated but since 64 is not evenly divisible by 24 (8 bytes/3 bytes=2⅔) the replication is not constant for every cycle. That is, the color components of the pixels are not constant for all cycles although there is a sequence that repeats every three cycles (24 bytes).

TABLE 4

8 BPP Color Component Alignment

| | Byte 7 | Byte 6 | Byte 5 | Byte 4 | Byte 3 | Byte 2 | Byte 1 | Byte 0 |
|---|---|---|---|---|---|---|---|---|
| Cycle N | BLU | BLU | BLU | BLU | BLU | BLU | BLU | BLU |

TABLE 5

16 BPP Color Component Alignment

| | Byte 7 | Byte 6 | Byte 5 | Byte 4 | Byte 3 | Byte 2 | Byte 1 | Byte 0 |
|---|---|---|---|---|---|---|---|---|
| Cycle N | GRN | BLU | GRN | BLU | GRN | BLU | GRN | BLU |

TABLE 6

24 BPP Color Component Alignment

| | Byte 7 | Byte 6 | Byte 5 | Byte 4 | Byte 3 | Byte 2 | Byte 1 | Byte 0 |
|---|---|---|---|---|---|---|---|---|
| Cycle 0 | GRN | BLU | RED | GRN | BLU | RED | GRN | BLU |
| Cycle 1 | BLU | RED | GRN | BLU | RED | GRN | BLU | RED |
| Cycle 2 | RED | GRN | BLU | RED | GRN | BLU | RED | GRN |

The foreground and background colors are replicated using muxes that select one of the three byte segments of the color registers for each of the eight bytes. By examining the tables above it will be observed that bytes 6 and 7 are simply duplicates of bytes 0 and 1 in the replication logic. The control signals for the replication muxes are generated in the monochrome data control block. That block generates the control signals for both the foreground and background replication mux blocks. The monochrome data control block also generates the signals that control the selection between the foreground and background colors which are essentially the monochrome source or pattern data replicated by the appropriate amount (1, 2, or 3) for the selected pixel depth; these signals are essentially the byte write enable bits that either are stored with the pattern when the monochrome pattern is expanded, or are passed along with the expanded source data when expanding monochrome source data.

As mentioned at the beginning of the detailed description, application is not limited to the specific embodiment and variations described above. The claims, their equivalents, and their equivalent language define the scope of protection.

What is claimed is:

1. A method of clipping a graphical image to a destination, comprising:

using linear addresses to generate said graphical image;

extracting the source data defining said graphical image from a section of memory;

determining if a first portion of said image defined by said source data is to be written, and determining if a second portion of said image defined by said source data is to be clipped;

preventing the combination of said second portion of said image defined by said source data with expansion of data defining said second portion of said image; and allowing said first portion of said image defined by said source data to be expanded and written to a destination.

2. A method of clipping a graphical image to a destination, comprising:

extracting the source data defining said graphical image from a section of memory, said source data including monochromatic source data, wherein said monochromatic source data occupies one bit per pixel;

determining if a first portion of said image defined by said source data is to be written, and determining if a second portion of said image defined by said source data is to be clipped;

preventing the combination of said second portion of said image defined by said source data with expansion of data defining said second portion of said image; and allowing said first portion of said image defined by said source data to be expanded and written to a destination.

3. A method of clipping a graphical image to a destination, comprising:

using linear addresses to generate said graphical image;

extracting the source data defining said graphical image from a section of memory;

determining if a first portion of said image defined by said source data is to be written, and determining if a second portion of said image defined by said source data is to be clipped, said first portion and said second portions having a rectangular shape;

preventing the combination of said second portion of said image defined by said source data with expansion data defining said second portion of said image; and allowing said first portion of said image defined by said source data to be expanded and written to a destination.

4. A method of clipping a graphical image to a destination, comprising:

extracting the monochromatic source data defining said graphical image from a section of memory, wherein said source data is bit-packed;

determining if a first portion of said image defined by said source data is to be written, and determining if a second portion of said image defined by said source data is to be clipped, said first portion and said second portions having a rectangular shape;

preventing the combination of said second portion of said image defined by said source data with expansion data defining said second portion of said image; and allowing said first portion of said image defined by said source data to be expanded and written to a destination.

5. A method of clipping a graphical image to a destination, comprising:

extracting the monochromatic source data defining said graphical image from a section of memory, wherein said source data is byte-packed;

determining if a first portion of said image defined by said source data is to be written, and determining if a second portion of said image defined by said source data is to be clipped, said first portion and said second portions having a rectangular shape;

preventing the combination of said second portion of said image defined by said source data with expansion data defining said second portion of said image; and allowing said first portion of said image defined by said source data to be expanded and written to a destination.

6. A method of clipping graphical image to a destination, comprising:

extracting the monochromatic source data defining said graphical image from a section of memory, wherein said source data is bit-packed;

determining if a first portion of said image defined by said monochromatic source data is to be written, and determining if a second portion of said image defined by said monochromatic source data is to be clipped, said first portion of said image and said second portion of said image having a rectangular shape;

preventing the combination of said second portion of said image defined by said monochromatic source data with expansion data defining said second portion of said image, said expansion data including one or more detailed image attributes; and allowing said first portion of said image defined by said monochromatic source data to be expanded to include color data and written to a destination.

7. A method of clipping a graphical image to a destination, comprising:

extracting the monochromatic source data defining said graphical image from a section of memory, wherein said source data is byte-packed;

determining if a first portion of said image defined by said monochromatic source data is to be written, and determining if a second portion of said image defined by said monochromatic source data is to be clipped, said first portion of said image and said second portion of said image having a rectangular shape;

preventing the combination of said second portion of said image defined by said monochromatic source data with expansion data defining said second portion of said image, said expansion data including one or more detailed image attributes; and allowing said first portion of said image defined by said monochromatic source data to be expanded to include color data and written to a destination.

8. A method of clipping a graphical image to destination, comprising:

extracting the source data defining said graphical image from a section of memory, wherein said monochromatic source data occupies one bit per pixel;

determining if a first portion of said image defined by said source data is to be written, and determining if a second portion of said image defined by said source data is to be clipped, said first portion and said second portions having a rectangular shape;

preventing the combination of said second portion of said image defined by said source data with expansion data defining said second portion of said image; and allowing said first portion of said image defined by said source data to be expanded and written to a destination.

9. An apparatus for clipping a graphical image to a clip region, comprising:

an apparatus for clipping a graphical image to clip region, comprising:

means for extracting bit-packed source data defining said graphical image from a section of memory, wherein said source data is bit-packed;

means for determining if a first portion of said image defined by said source data is to be written, and determining if a second portion of said image defined by said source data is to be clipped;

means for preventing the combination of said second portion of said image defined by said source data with expansion data defining said second portion of said image; and means for allowing said first portion of said image defined by said source data to be expanded and written to a destination.

10. An apparatus for clipping a graphical image to a clip region, comprising:

means for extracting byte-packed source data defining said graphical image from a section of memory, wherein said source data is byte-packed;

means for determining if a first portion of said image defined by said source data is to be written, and determining if a second portion of said image defined by said source data is to be clipped;

means for preventing the combination of said second portion of said image defined by said source data with expansion data defining said second portion of said image; and means for allowing said first portion of said image defined by said source data to be expanded and written to a destination.

11. An apparatus for clipping a graphical image to a clip region, comprising:

means for extracting source data defining said graphical image from a section of memory, wherein said source data is bit-packed and monochromatic;

means for determining if a first portion of said image defined by said source data is to be written, and determining if a second portion of said image defined by said source data is to be clipped;

means for preventing the combination of said second portion of said image defined by said source data with expansion data defining said second portion of said image, said expansion data including one or more detailed image attributes; and means for allowing said first portion of said image defined by said source data to be expanded to include color data and written to a destination.

12. An apparatus for clipping a graphical image to a clip region, comprising:

means for extracting source data defining said graphical image from a section of memory, wherein said source data is byte-packed and monochromatic;

means for determining if a first portion of said image defined by said source data is to be written, and determining if a second portion of said image defined by said source data is to be clipped;

means for preventing the combination of said second portion of said image defined by said source data with expansion data defining said second portion of said image, said expansion data including one or more detailed image attributes; and means for allowing said first portion of said image defined by said source data to be expanded to include color data and written to a destination.

* * * * *

UNITED STATES PATENT AND TRADEMARK OFFICE

CERTIFICATE OF CORRECTION

PATENT NO. : 6,061,047

DATED : May 9, 2000

INVENTOR(S) : T. Dean Skelton

It is certified that error appears in the above-identified patent and that said Letters Patent is hereby corrected as shown below:

In the section entitled "DETAILED DESCRIPTION OF THE PREFERRED EMBODIMENT(S)", on line 4 of column 7, please replace "If the width of each scanline if 24 BPP mode is an even multiple of 24 bytes" with --If the width of each scanline in 24 BPP mode is an even multiple of 24 bytes--.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*